United States Patent [19]

Peel

[11] 3,880,381

[45] Apr. 29, 1975

[54] SEAT BELT RETRACTOR MECHANISM

[75] Inventor: Richard E. Peel, Farmington Hills, Mich.

[73] Assignee: Ford Motor Company, Dearborn, Mich.

[22] Filed: Apr. 30, 1974

[21] Appl. No.: 465,633

[52] U.S. Cl............................ 242/107.4; 242/107.4
[51] Int. Cl.............................................. B65h 75/48
[58] Field of Search ....... 242/107.4–107.6; 297/386, 297/388; 280/150 SB

[56] References Cited
UNITED STATES PATENTS

| | | | |
|---|---|---|---|
| 3,604,655 | 9/1971 | Jones................................ | 242/107.4 |
| 3,664,599 | 5/1972 | Partridge ......................... | 242/107.4 |
| 3,711,037 | 1/1973 | Jakob............................... | 242/107.4 |
| 3,819,126 | 6/1974 | Stoffel.............................. | 242/107.4 |

*Primary Examiner*—Leonard D. Christian
*Attorney, Agent, or Firm*—John J. Roethel; Keith L. Zerschling

[57] ABSTRACT

A seat belt retractor mechanism having a belt receiving reel adapted to be held against rotation in belt protraction direction by a locking bar. The locking bar is driven into locking position by an inertia sensor means including a pendulum.

The improvement comprises a lever pivotally suspended from an extension of the reel shaft, the lever pivotally supporting a pawl for swinging movement into and out of engagement with an annular ratchet coupled to the reel for rotation with the latter. A bell crank means interposed between the pawl and the pendulum is responsive to acceleration displacement of the pendulum to pivot the pawl into engagement with the annular ratchet. Rotation of the reel caused by protraction forces exerted on the belt immediately following pendulum displacement causes the annular ratchet to bodily shift the engaged pawl in a direction to pivot the locking bar into locking engagement with the reel to prevent further belt protraction movement.

7 Claims, 2 Drawing Figures

SEAT BELT RETRACTOR MECHANISM

BACKGROUND OF THE INVENTION

Vehicle seat belt retractor mechanisms are known in which the reel is freely movable in belt protraction and retraction directions so that the belt coupled to the reel places no substantial restraint on the seat occupant under normal vehicle operating conditions. This arrangement is particularly desirable for the vehicle operator who must be free to move against restraint imposed by a shoulder harness so that various control knobs on the instrument panel may be reached.

In one class of retractor mechanisms, an inertia reel mechanism is utilized which is vehicle sensitive. That is, rapid acceleration (or deceleration) of the vehicle is sensed by an inertia device, such as a pendulum. Movement of the inertia device results in a locking bar or pawl being driven into engagement with the reel to prevent protraction of the belt. In a mechanism in which the locking bar or pawl is directly driven by the pendulum, the locking bar or pawl sometimes fails to immobilize the reel because the locking bar or pawl bounces or skips across the top of the ratchet teeth of the rapidly rotating reel.

U.S. Pat. No. 3,578,260 issued May 11, 1971 to John Kell for "Inertia Reel Mechanisms" recognizes the problem and offers a mechanism for preventing such locking bar or pawl bounce or skip.

It is an object of the present invention to provide a further improvement in an inertia reel mechanism which assures positive and complete sequential action of the retractor lockup under adverse vehicle operating conditions.

SUMMARY OF THE INVENTION

This invention relates to a seat belt retractor mechanism having a belt receiving reel means rotatably extending between spaced side walls of a support bracket. The reel means includes a shaft having a ratchet plate at each of its ends in proximity to an inner side of a sidewall, the ratchet plates having peripheral ratchet teeth. A locking bar paralleling the reel means shaft is pivotally mounted in the side walls for movement into engagement with the ratchet plates to lock the reel against rotation in seat belt protraction direction. An inertia sensor is coupled to the locking bar for driving the latter into ratchet plate engagement upon acceleration of the sensor, the sensor comprising a pendulum suspended from a support plate mounted on the outer side of one of the side walls.

The seat belt retractor mechanism embodying the present invention comprises an extension of the reel shaft projecting through the wall supporting the pendulum. An annular ratchet plate having internal ratchet teeth is coupled to the shaft extension. Pivotally suspended from the shaft extension is a lever. The free end of the lever lies in abutting relation to the locking bar.

A pawl is pivotally mounted on the suspended lever for swinging movement into and out of engagement with the annular ratchet. A bell crank means mounted on the outer side of the one side wall is coupled to the pawl and is responsive to acceleration displacement of the pendulum for pivoting the pawl into engagement with the annulus ratchet. Upon rotation of the reel caused by protraction forces exerted on the belt attached thereto immediately following pendulum displacement, the annular ratchet causes the engaged pawl to be bodily shifted in a direction to pivot the locking bar into locking engagement with the reel ratchet plates to prevent further belt protraction movement.

DESCRIPTION OF THE DRAWING

Further features and advantages of the present invention will be made more apparent as this description proceeds, reference being had to the accompanying drawing, wherein.

DETAILED DESCRIPTION OF THE INVENTION

Figure 1:
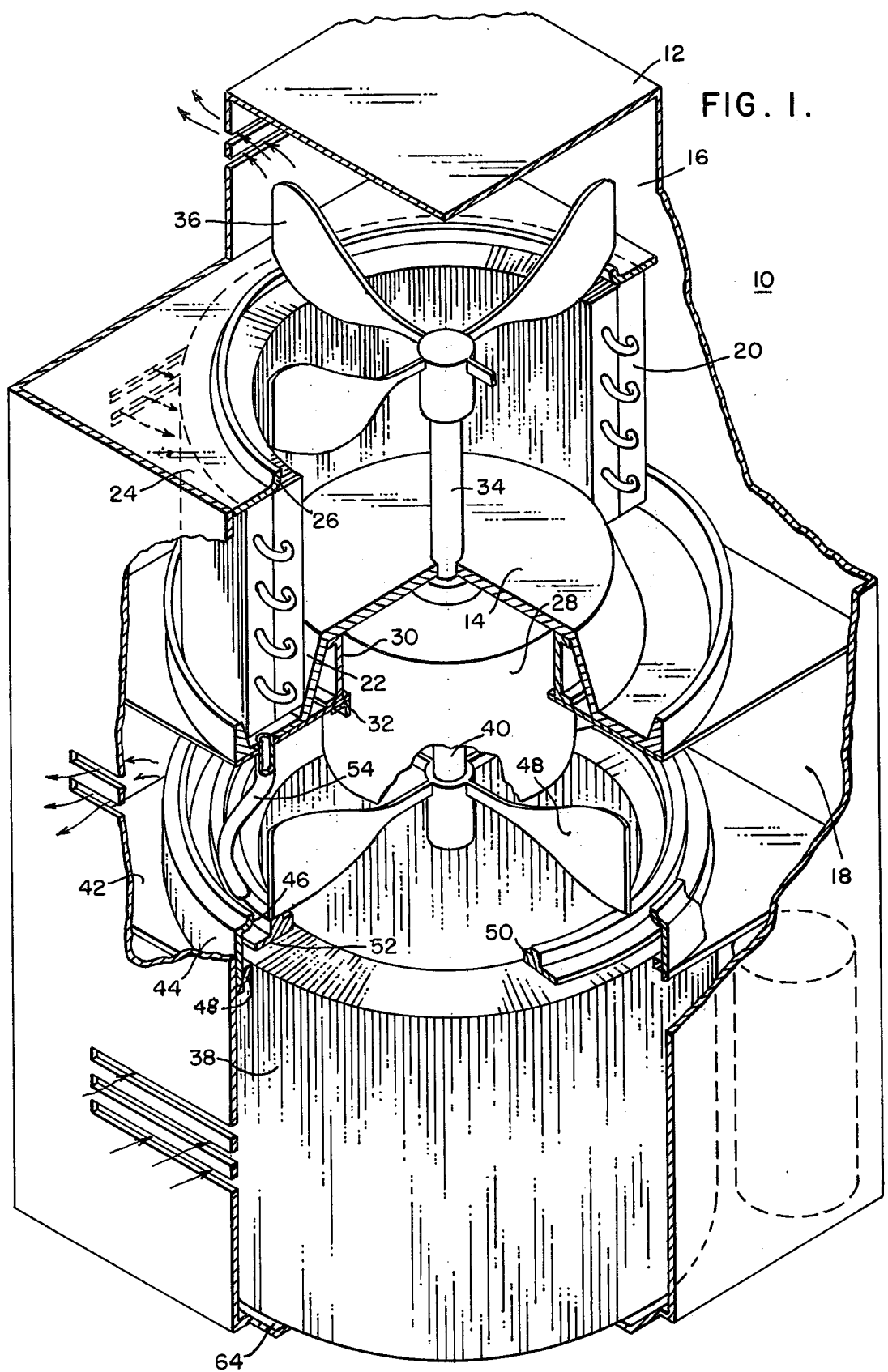
FIG. 1 is a side elevation of an inertial retractor mechanism embodying the present invention.
Figure 2:
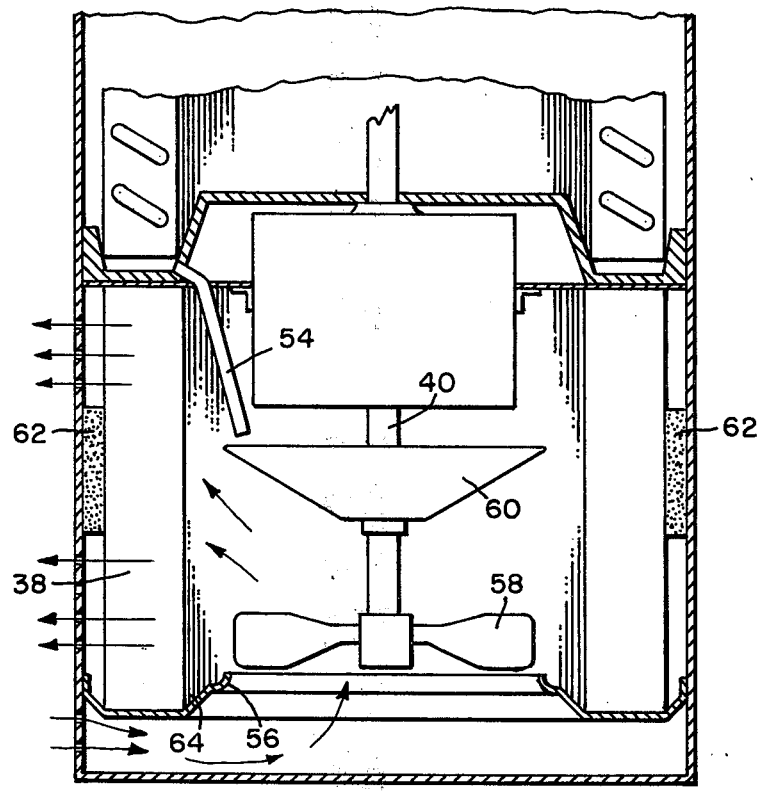
FIG. 2 is a fragmentary view in part sectional taken in the direction of the arrow 2 in FIG. 1.

Referring now to the drawing there is shown one end of a seat belt retractor mechanism, generally designated 10. The retractor mechanism comprises a belt receiving reel 11 rotatably mounted on a shaft 12 journalled in a side wall 13 of a support bracket 14. It will be understood that the reel 11 and its mounting shaft 12 extend to a second side wall, not visible. The reel 11 is coupled at the second wall to a rewind spring (not shown) in a conventional manner.

At each of its ends within the bracket side walls, the reel 11 carries a ratchet plate 15 having peripheral ratchet teeth 16. An elongated bar 17 parallels the reel 11 and its shaft 12, the bar being pivotally mounted within the bracket 14 and having at each end a locking or pawl portion 18 projecting in a general direction of the ratchet teeth 16.

On the outboard side of the bracket side wall 13 is a support plate 19 extending outwardly from a base plate 21 bolted to the bracket side wall 13 by bolts 22. Suspended from the support plate 19 is a pendulum 23. The pendulum 23 comprises a cylindrical weight 24 hanging from a rod 25 projecting through an aperture 26 in the support plate 19. The rod 25 is coupled at its upper end to a circular cap or disc member 27 which rests upon the upper surface of the support plate 19. The circular cap or disc member 27 has a concave pocket 28 in its upper surface.

Perhaps it should be explained at this time that although the pendulum appears in the several views of the drawing to be hanging at an angle, in reality it hangs in a substantially vertical direction when the retractor mechanism 10 is mounted on a vehicle body structure. That is, the line 29 having the arrow at its lower end is perpendicular to the ground plane on which the vehicle sits. In installed position the bracket 14 is mounted, for example, on an inclined roof rail surface and when the bracket is anchored to the roof rail the retractor pendulum ends up in its vertical position.

The improved structure in the vehicle sensitive inertia-type retractor embodying the present invention comprises an extension 31 on the reel shaft 12. The shaft extension 31 projects outboard of the side wall 13 of the support bracket 14. An annular ratchet plate 32 is keyed to the shaft extension 31 to rotate in synchronism with the reel 11 and the ratchet plates 15 of the reel. The annular ratchet plate 32 has a plurality of internal ratchet teeth 33.

Outboard of the annular ratchet plate, the extension shaft 32 pivotally carries a depending lever 34. At its lower end the suspended lever 34 has a laterally offset portion 35 terminating in a further downwardly depending leg portion 36 having a knob-shaped abutment 37 projecting upwardly therefrom. The abutment 37 underlies a paddle portion 38 of a longitudinal extension 39 of the locking bar 17.

Intermediate its ends the depending or suspended lever 34 carries a pivot shaft 41 which on its end toward the side wall 13 carries a pawl 42. The pawl 42 is adapted to engage the ratchet teeth 33 of the annular ratchet plate, for a purpose to become apparent.

On its opposite or outboard end the pivot shaft 41 is coupled to a crank arm 43 having a slot 44 adjacent its free end. The slot 44 receives a pin 45 carried on the free end of an arm 46 of a bell crank 47 pivotally supported by a pivot stud 48 fixed in the support bracket 14 side wall 13.

The second arm 49 of bell crank 47 extends over the concave disc member 27 of the sensor means and is provided with a depending conically tipped projection 51 aligned with the longitudinal axis of the rod 25 in the at rest position of the pendulum.

The ratchet plate 32 with the internal ratchet teeth 33 functions as an index gear. That is, the teeth 33 are positioned relative to the teeth 16 on the reel ratchet plates 15 so that the locking bar projections 18 are driven into full depth insertion into a tooth 16 of the ratchet plates 15 in timed sequence to engagement of the pawl 42 with a tooth 33 of the ratchet plate 32. The importance of the foregoing may best be understood by an explanation of the operation of the retractor mechanism.

When the vehicle in which the retractor mechanism embodying the present invention is mounted is suddenly stopped, as by a hard application of the brakes or upon impact with a barrier or another vehicle, the pendulum 23 senses the vehicle deceleration in that it is accelerated from an at rest position relative to the vehicle. As the pendulum 22 tilts relative to the support plate 19, it causes the bell crank 47 to be rotated in a clockwise direction about the pivot pin 48, as viewed in FIG. 1. Rotation of the bell crank 47 causes the crank arm 43 to swing in a counterclockwise direction. This causes the engagement with a tooth 33 of the annular ratchet plate 32. As noted, the annular ratchet plate 32 functions as an indexing gear in that it is fixed to the retractor shaft in a predetermined relationship to the ratchet plates forming part of the reel structure.

During the initial movement of the parts of the retractor mechanism in response to movement of the pendulum 23, no movement of the locking bar 17 occurs and the reel 11 remains free to rotate.

If the deceleration forces on the vehicle are great enough, the seat belt restrained seat occupant will move forwardly relative to the vehicle seat causing the shoulder harness belt segment coupled to the reel 11 to rotate the reel slightly in belt protraction direction. This would be in a counterclockwise direction as viewed in FIG. 1. This causes the annular ratchet plate 32 to be rotated in a counterclockwise direction at the same angular velocity as the reel 11. The rotation of the annular ratchet plate 32 exerts a longitudinal force on the pawl 42 driving the depending lever 34 in a counterclockwise direction about its pivot point, the shaft extension 31. Upon the lever 34 being swung its lower end 36 abuts the paddle portion 38 of the locking bar 17 causing the locking or pawl portions 18 to be lifted into engagement with the ratchet plates 15 at a predetermined point between two ratchet teeth 16, thus eliminating any possibility of tooth-tip contact. This immediately causes the reel to be locked against further belt protraction rotation.

It is to be understood this invention is not limited to the exact construction illustrated and described above, but that various changes and modifications may be made without departing from the spirit and scope of the invention as defined by the following claims.

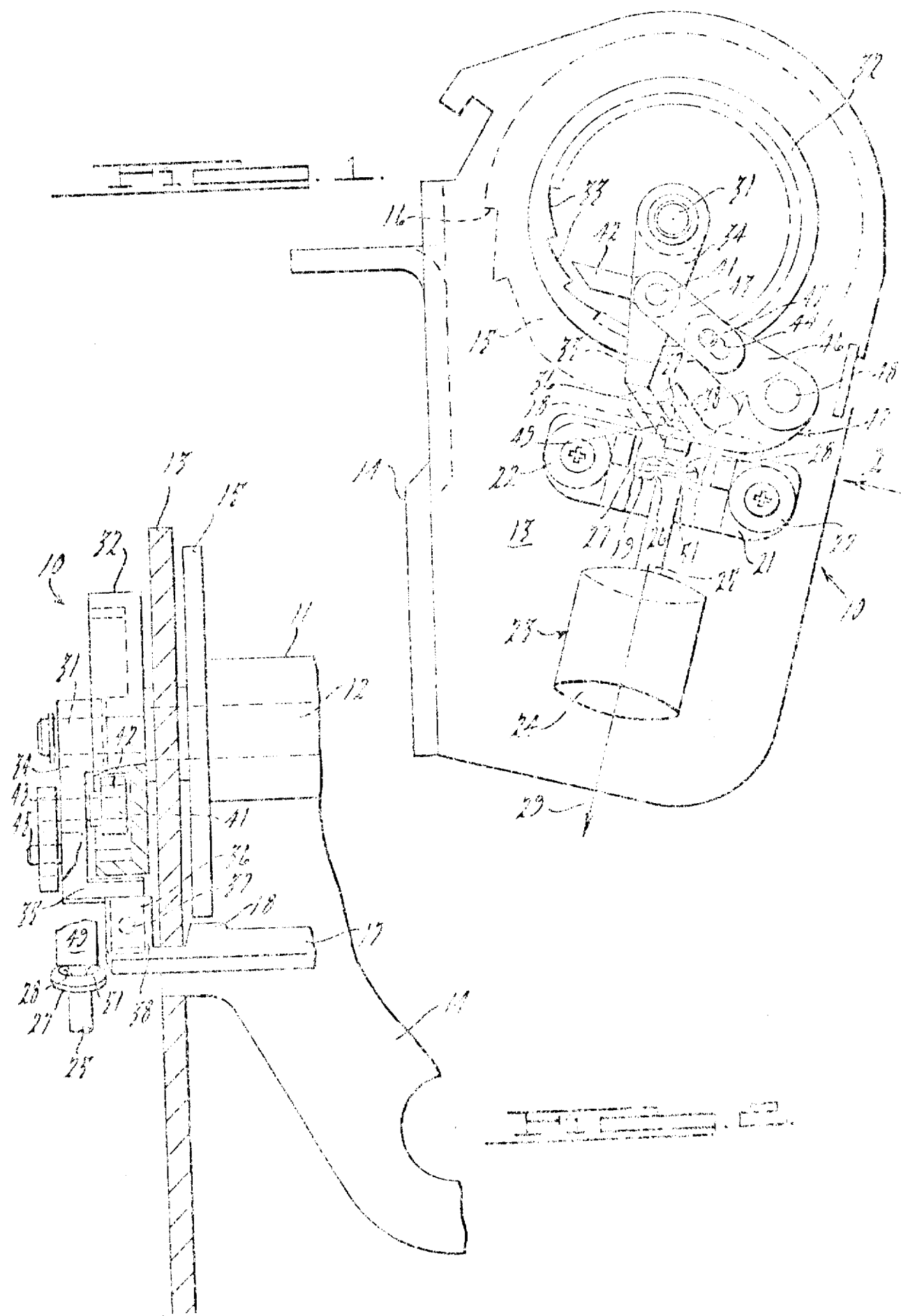

I claim:

1. A seat belt retractor mechanism having a belt receiving reel means rotatably extending between spaced sidewalls of a support bracket, the reel means including a shaft having a ratchet plate at each of its ends in proximity to an inner side of a sidewall, the ratchet plates having peripheral ratchet teeth, a locking bar paralleling the reel means shaft pivotally mounted in the sidewalls for movement into engagement with the ratchet plates to lock the reel against rotation in seat belt protraction direction, and an inertia sensor coupled to the locking bar for driving the latter into ratchet plate engagement upon acceleration of the sensor, the inertia sensor comprising a pendulum suspended from a support plate mounted on the outer side of one of the sidewalls, wherein the improvement comprises:

the reel shaft having an extension projecting through the sidewall supporting the pendulum, an annular ratchet plate keyed to the shaft extension, the annular ratchet plate having internal ratchet teeth, a lever pivotally suspended from the shaft extension with its free end in abutting relation to the locking bar, a pawl pivotally mounted on the pivotally suspended lever for swinging movement into and out of engagement with the annular ratchet, and a bell crank means mounted on the outer side of the one sidewall coupled to the pawl and responsive to acceleration displacement of the pendulum for pivoting the pawl into engagement with the annulus ratchet, rotation of the reel caused by protraction forces exerted on the belt immediately following pendulum displacement causing the annular ratchet to bodily shift the engaged pawl in a direction to pivot the locking bar into locking engagement with the reel ratchet plates to prevent further belt protraction movement.

2. A seat belt retractor mechanism according to claim 1, in which:

the annular ratchet plate teeth are positioned in a predetermined relationship to the reel means ratchet plate teeth, the locking bar being driven into full depth insertion into the reel means ratchet plate teeth in timed sequence to engagement of the pawl with a tooth of the annular ratchet plate.

3. A seat belt retractor mechanism according to claim 1, in which:

the bell crank means includes a bell crank arm having a lost motion pin and slot connection with a lever arm coupled to the pawl, the lost motion connection permitting the pivot center of the pawl to move with the suspended lever relatively to the pivot center of the bell crank, the bell crank pivot center being fixed to the one sidewall.

4. A seat belt retractor mechanism according to claim 3, in which:

the annular ratchet plate teeth are positioned in a predetermined relationship to the reel means ratchet plate teeth, the locking bar being driven into full depth insertion into the reel means ratchet plate teeth in timed sequence to engagement of the pawl with a tooth of the annular ratchet plate.

5. A seat belt retractor mechanism according to claim 1, in which:

the bell crank means includes a bell crank pivoted on a pivot means fixed to the one sidewall, the bell crank having a first arm lying in abutting relation to a part of the pendulum whereby the bell crank will be tilted in response to acceleration displacement of the pendulum.

6. A seat belt retractor mechanism according to claim 5, in which:

the bell crank has a second arm having a lost motion pin and slot connection with a lever arm fixedly coupled to the pawl, the lost motion connection permitting the pivot center of the pawl to move relatively to the pivot center of the bell crank.

7. A seat belt retractor mechanism according to claim 6, in which:

the annular ratchet plate teeth are positioned in a predetermined relationship to the reel means ratchet plate teeth, the locking bar being driven into full depth insertion into the reel means ratchet plate teeth in timed sequence to engagement of the pawl with a tooth of the annular ratchet plate.

* * * * *

UNITED STATES PATENT OFFICE
CERTIFICATE OF CORRECTION

Patent No. 3,880,381  Dated April 29, 1975

Inventor(s) Richard E. Peel

It is certified that error appears in the above-identified patent and that said Letters Patent are hereby corrected as shown below:

Cancel all drawings and insert the corrected drawings as shown on the attached sheet.

Signed and Sealed this twenty-eight Day of October 1975

[SEAL]

Attest:

RUTH C. MASON
*Attesting Officer*

C. MARSHALL DANN
*Commissioner of Patents and Trademarks*